Dec. 19, 1939.   C. S. ASHCRAFT   2,183,733
METHOD AND APPARATUS FOR THE PROJECTION OF MOTION PICTURES
Filed Oct. 21, 1938
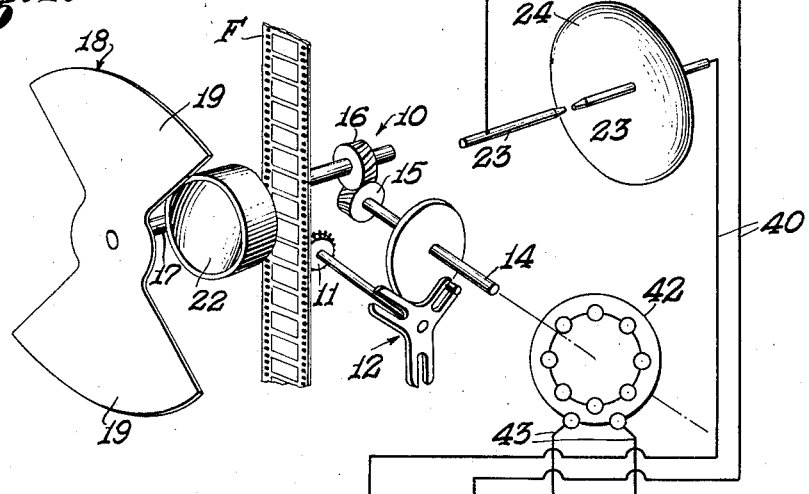
Fig. 1.
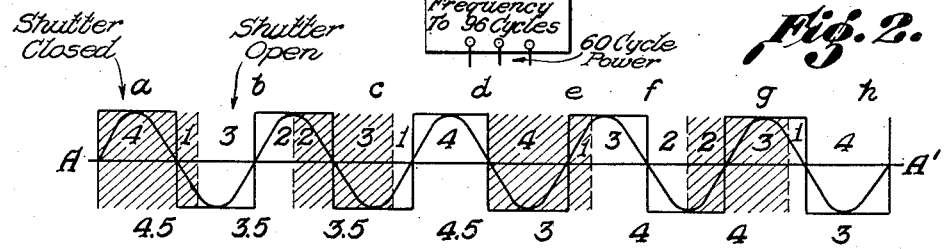
Fig. 2.
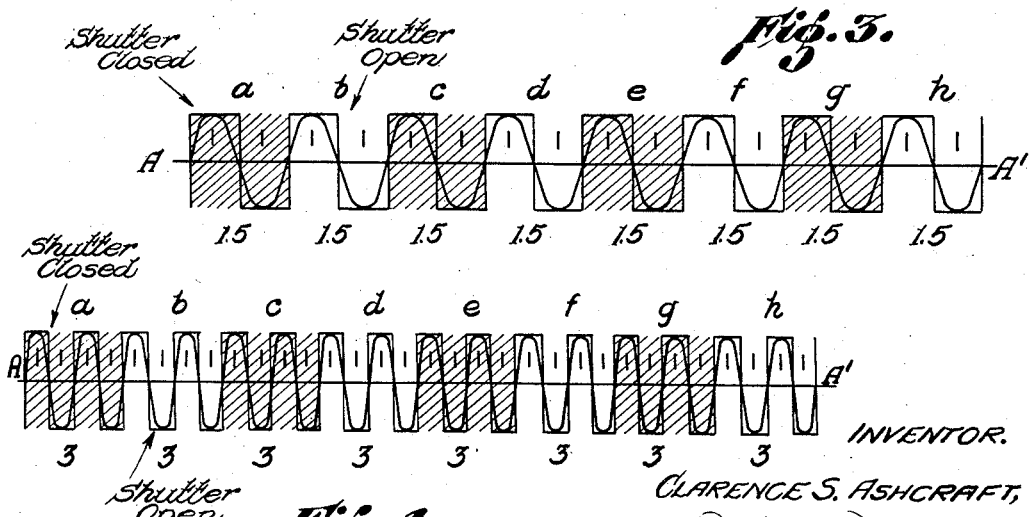
Fig. 3.
Fig. 4.
INVENTOR.
CLARENCE S. ASHCRAFT,
BY Darby & Darby
ATTORNEY.

Patented Dec. 19, 1939

2,183,733

UNITED STATES PATENT OFFICE 2,183,733

METHOD AND APPARATUS FOR THE PROJECTION OF MOTION PICTURES

Clarence S. Ashcraft, Bayside, Long Island, N. Y.

Application October 21, 1938, Serial No. 236,142

6 Claims. (Cl. 88—18)

This invention relates generally to motion picture projectors and is concerned with the adaption of motion picture projectors to operation by alternating electrical supply currents.

In the art to which this invention appertains it is common practice to utilize a motion picture projector having film moving means adapted to intermittently move a film, electric arc carbons forming a source of light, optical means for casting a beam of light from said source through the film, and a shutter comprising blades providing separated light openings moving in the path of the light beam and driven in such consonance with the film moving means that two shutter openings pass the light beam during each stationary period of the film; and means for driving the projector at a speed to move the film at the required number of frames per second.

In the past, direct current rather than alternating current has been used almost exclusively for supply of the electric arc carbons of motion picture projectors for the reason that an alternating current arc produces a pulsating light which, when further intercepted by the operation of the projector shutter, results in a light output that pulsates periodically. This rapid pulsation appears as a definite flicker which is very noticeable and objectionable, making it entirely unsatisfactory for the projection of motion pictures.

Some years ago extensive efforts were made to introduce a motion picture projector incorporating an electric arc operating on 50 or 60 cycle alternating current. These efforts, however, met with failure due to the fact that it is standard practice in projection to move a motion picture film at the rate of 24 frames per second, and to use a two bladed projector shutter (having two diametrically opposed openings of 90° each), operated at one revolution per each intermittent movement of the film, so there will be two shutter openings for each stationary period of the film, and 48 shutter openings per second. When it was attempted to supply 60 cycle alternating current to the electric arc carbons, and the projector driven to give 48 shutter openings per second, there were 120 alternations of current per second to be divided between 48 shutter openings per second, with the result that the amount of light passed by the shutter continually varied. In the case of 50 cycle current the differential of 2 cycles between the frequency of the arc current and the standard number of shutter openings (48) per second caused a slow but noticeable pulsation accompanied by a distinct color variation. Consequently the motion picture projector incorporating an electric arc operated on 50 or 60 cycle alternating current was not successful.

It is obvious that if exact synchronism is made to exist between the shutter frequency and the current frequency and the phase relation maintained so that when the current cycle is producing the maximum amount of light, the shutter openings are allowed the maximum amount of light to pass through, an ideal condition would exist. However, this method would not only make it necessary to provide means for changing the commercial frequency into 48 cycle current, by means of expensive apparatus, but it would also be necessary to provide interlocking means to hold the projector mechanism in synchronism with the 48 cycle arc current, and also to provide means for adjusting the phase relation between the arc supply current and the shutter openings. The complication and extremely high cost of such equipment makes this method of projection prohibitive. It must also be understood that should the shutter shift as much as 90 degrees, when the arc is operating at 48 cycles, there would be a change in light intensity of as much as 50%. The intensity of the light projected would depend entirely upon the phase relation existing between the arc supply current and the shutter openings.

It is accordingly an object of the present invention to provide a method of operating a motion picture projector, incorporating a source of light operating on alternating current, which will eliminate all such flicker and fading effects as are described above.

It is another object of this invention to provide a method of operating a motion picture projector, incorporating a source of light operating on alternating current, whereby a substantially equal amount of light is being projected continuously through each successive shutter opening in which there is no visible periodic flicker or beat.

Other objects and advantages of my invention will become apparent in the following description.

During my experiments I discovered that if the electric arc, incorporated in a motion picture projector, is supplied with alternating current of frequencies which are substantially four times the frequency of film frames per second, or substantially even multiples of the frequency of the light interceptions per second, caused by the rotation of the projector shutter, that the light which is projected will be steady and of uniform brilliancy, and will retain all the advantages of alternating current operation while eliminating all the disadvantages encountered with commercial alternating currents. I have discovered, in this connection, if the light is intercepted 48 times per second in accordance with present standard practice, that alternating currents of about 96 cycles and about 192 cycles, etc., which are even multiples of the 48 cycle frequency of the light interceptions, provide uniform illumination during each shutter open period and a like amount of light during each period of light interception and are eminently satisfactory for the practice of my invention.

For the purpose of explaining my invention to those skilled in the art in order that they may practice the same, I will describe in detail a method of the preferred form of my invention. In the description which follows I will describe the details of construction of a motion picture projector, the rate of film frames projected per second, the number of light interceptions per second, and current supply frequencies as well as other definite qualities and quantities which are involved in the performance of the preferred process of my invention.

It should be strictly understood that by choosing a single specific embodiment of my invention for illustrative purposes, I do not intend to be limited to the details thereof, but on the contrary intend that my invention shall be broadly construed in accordance with the preceding statement of invention to include any and every process and apparatus which utilizes the principles of the invention and comes within the broad scope of the appended claims.

In my copending application Serial No. 236,143, filed October 21, 1938, I have disclosed a rotary converter and switching arrangement whereby 60 cycle current may be converted into 96 cycle current, and this 96 cycle current used to operate one arc while 60 cycle current is being used to heat a second arc preliminary to its operation. Such structure is particularly adapted for use in connection with the invention disclosed herein.

The invention will be best understood from the following description of illustrative means diagrammatically typifying the invention, reference for this purpose being had to the accompanying drawing, in which:

Figure 1 is a diagrammatic perspective layout illustrating schematically a preferred form of the present invention;

Figure 2 is a diagram illustrating graphically the open and closed periods, for a duration of two complete revolutions of a projector shutter having two diametrically opposed blades of 90 degrees each and rotating at a speed of 24 revolutions per second, superimposed thereon, in the proper time relation, are the respective alternations of 60 cycle current;

Figure 3 is a diagram illustrating graphically the open and closed periods, for a duration of two complete revolutions, of a projector shutter having two diametrically opposed blades of 90 degrees each and rotating at a speed of 24 revolutions per second, superimposed thereon, in the proper time relation, are the respective alternations of 96 cycle current in accordance with my invention;

Figure 4 is a diagram illustrating graphically the open and closed periods, for a duration of two complete revolutions, of a projector shutter having two diametrically opposed blades of 90 degrees each and rotating at a speed of 24 revolutions per second, superimposed thereon, in the proper time relation, are the respective alternations of 192 cycle current in accordance with my invention.

In Fig. 1 the numeral 10 designates generally a somewhat diagrammatically illustrated motion picture projector, the projector being shown as having film advancing sprocket 11 operated by Geneva movement 12 driven by shaft 14. Shaft 14 is shown as having a spiral gear 15 meshing with a spiral gear 16 on shutter shaft 17, gears 15 and 16 having a ratio of one to one. On the forward end of shaft 17 is the shutter 18, shown as having two opposed 90 degree blades 19. Between the shutter and the film strip F, threaded on sprocket 11, is the usual projection lens 22, and on the optical axis of lens 22 at the proper location back of the film are the carbons 23 and reflector 24. The optical arrangement illustrated is of the reflector arc type, although it will be understood the invention is not limited to a reflector and carbons disposed in the line of the optical axis of the system, since other well known optical arrangements for projection of an arc likewise produce a light having a cycle of intensity corresponding to the current cycle. Shutter 18 makes one revolution for each intermittent movement of the film, the parts being so related that the film moves during the time one of the shutter blades covers the projection lens 22, and the shutter "opens", or uncovers the projection lens, twice for each stationary period of the film.

The projector drive motor 42, which may be of any usual type, is supplied with electrical current by means of leads 43, and is designed and arranged to drive projector shaft 14 at substantially 1440 revolutions per minute. Any method of driving shaft 14 at proper speed is suitable, however, as there is no exact synchronous relation necessary between the projector and the source of electrical supply for the carbons. Film strip F is accordingly intermittently moved, with present standard practice, at a speed of 24 frames per second, and the shutter is rotated at 24 revolutions per second. Since the shutter has in the present instance two 90 degrees blades, there are accordingly 48 shutter openings per second, or two shutter openings per film frame, as usual.

In Fig. 1 is shown a block circuit diagram of a frequency conversion unit adapted to change the usual supply line current of 60 cycles to the preferred embodiment, 96 cycles. However, the current may be of any of the frequencies mentioned and used from whatever source obtained. The output of the frequency converter is connected by means of leads 40 to carbons 23.

Fig. 2 shows the relation of 60 cycle current frequency to the frequency of the light interceptions, 48 per second in accordance with present standard practice, in which the shaded areas a, c, e and g represent the closed portions of a shutter and b, d, f and h represent the shutter openings for two complete revolutions of the shutter. The positive alternations or half cycles shown above the center or zero line A—A' represent the power impulses supplied to the electric carbon 23 facing reflector 24, Fig. 1. I have found that the full value of light produced by this alternation is reflected through the film and lens 22, and that the half cycle or alternation below line A—A' acting upon the carbon facing away from the reflector has a reduced value due to its position with respect to the reflector and approximately only one-half the light is projected from this carbon as is projected by the carbon facing the reflector. The shaded areas are equal to the unshaded areas and have equal time values, each area representing 1/96 of a second which is the time consumed for one shutter blade to pass entirely through the light beam when the shutter is intercepting the light beam 48 times per second. At 60 cycle current the time necessary for one complete half cycle, or alternation, is 1/120 of a second. The ratio between the time necessary for one shutter opening and one arc alternation is 96:120, or 4:5. Therefore each open and closed portion of the shutter is hypothetically divided into five parts. During the first shutter opening $b$ the negative half cycle is projecting light during 3/5 of the shutter opening while the positive half cycle is projecting light during only 2/5 of the same shutter opening. During the second shutter opening $d$ the negative half cycle is active during 1/5 of the shutter opening while the positive half cycle is active during 4/5 of the same shutter opening. During the third shutter opening $f$ the positive half cycle is active during 3/5 of the shutter opening while the negative half cycle is active during only 2/5 of the same opening. During the fourth shutter opening $h$ the positive half cycle is only active during 1/5 of the shutter opening while the negative half cycle is active during 4/5 of the same opening. It will be noted that thereafter the same cycle of values will reoccur.

If the light value of the positive half cycle is one, as previously stated, and the value of the negative half cycle is .5 and these values are applied to the time values given, the following ratio for the successive light openings will exist: 3.5, 4.5, 4 and 3. These ratios indicate a continually varying light value during successive shutter openings which are repeated once every two revolutions of the shutter. Since the shutter rotates 24 times per second and each complete cycle of light variations extends over two complete shutter revolutions there are consequently 12 cycles of light variations, or 24 flickers per second.

The factors pertinent to this 24 cycle flicker are not only the rapidity of pulsation, but also the intensity or degree of increase of light from minimum to maximum during each cycle of light variations. In the present instance it has been shown that the minimum light value during a pulsation is 3, the maximum 4.5, indicating an increase over minimum of 50% in light value during each cycle of light variations.

Fig. 3 shows the relation of a 48 cycle per second light interception frequency to an arc supply frequency of 96 cycles, which is a preferred method of operation in accordance with my invention. The shaded areas $a$, $c$, $e$ and $g$ indicate the periods during which the shutter blades are intercepting the light and the unshaded areas $b$, $d$, $f$ and $h$ indicate the shutter openings which allow passage of light. As each shutter opening period represents an elapsed time of 1/96 of a second and each half cycle, or alternation, occurs in 1/192 of a second, the ratio between the time necessary for one shutter opening and one alternation of current is 96:192, or 1:2. As shown in Fig. 3, each half cycle will occur during one half of each shutter opening and likewise one complete cycle will occur during one complete shutter opening. In this way, two alternate complete cycles of light are projected through two successive shutter openings each time the film is held stationary, thus, with a two bladed shutter, the current frequency is four times the frequency of film frames per second. The number of light cycles is made double the number of shutter openings per second when the number of shutter openings is double the number of film frames per second. As I have shown that there is one complete cycle during each successive shutter opening and likewise one complete cycle during each successive light interception, it follows that there is also one complete positive alternation and one complete negative alternation of current during each successive shutter opening regardless of the phase relation existing between the arc supply current and the shutter openings. Therefore a shift in the phase relation between the arc supply current and the shutter openings will not alter the fact that the light produced by one complete positive alternation and one complete negative alternation of current will be projected through each successive shutter opening and that an equal amount of light will therefore be projected through each and every shutter opening.

Applying the same values as stated in the previous case, that is, one for the positive alternation which represents the power impulse supplied to the electric carbon facing the reflector and .5 for the negative alternation which represents the power impulse supplied to the carbon facing away from the reflector, the light projected through each successive opening of the shutter will have the identical value of 1.5, 1.5, 1.5, 1.5, etc.

I have further discovered, if otherwise standard practice is employed, that at frequencies of about 96 cycles and about 192 cycles there is no critical relation necessary between the supply current frequency and the light intercepting frequency. Should the arc supply current change in frequency to 95 or 97 cycles there would, of course, be a one cycle pulsation but the intensity of this pulsation would be less than 1% which would be so slight that it could not be detected with sensitive instruments. Likewise a change of 5 cycles in either direction in frequency would result in a 5 cycle pulsation of less than 5% intensity which would also be imperceptible. For this reason my invention covers a band of frequencies, in the instant example, around 96 cycles and 192 cycles.

I have determined by actual experiment that this band of frequencies, at the lower range, starts at about 86 cycles and extends upward to about 106 cycles, although it might also vary a few cycles higher or lower without being detected by the eye. There is a wide range of frequencies, therefore, from 86 to 106 cycles at which the arc may be operated, with a light interception frequency of 48, without any flicker being perceptible to the observer, and it is within this range that I prefer to operate in accordance with the principles of my invention.

If the light is intercepted 48 times per second, I have discovered that with supply currents of frequencies of from 48 to 72 cycles the pulsation rate increases in proportion to the increase in current frequency; that from 72 to 96 cycles the pulsation rate decreases in proportion to the increase in current frequency, reaching a minimum of zero pulsations per second at 96 cycles, and that from 96 to 120 cycles the pulsation rate again increases in proportion to the increase in current frequency, and that thereafter the same cycle of increase and decrease in the pulsation rate will reoccur as the current frequency is increased by a number equal to the number of light interceptions per second. That is, in the present instance, the pulsation frequency will increase from zero to maximum and decrease from maximum to zero during each increase of 48 cycles in the supply current frequency. I have also discovered that the intensity of the pulsations decreases from maximum at 50 cycles, as the current frequency is increased until 96 cycles is reached, at which frequency the pulsation intensity is zero. Above 96 cycles the intensity of the pulsations increases to maximum of about 25% at 144 cycles, it then again decreases, reaching zero only when the current frequency is equal to an even multiple of the 48 cycle light interception frequency, which is 192 cycles.

Fig. 4 shows the relation of an arc supply current frequency of 192 cycles, which is in accordance with my invention, to the standard light interception frequency of 48 cycles per second. Here again is shown, as in the case of 96 cycle current, a condition wherein an equal number of positive and negative alternations of current project light during each shutter opening and during each light interception which results in complete coordination of the arc supply current and the shutter openings.

From what has now been said it will be seen that my invention provides a method of projection whereby alternating currents may be used to supply the electric arc while achieving the uniform light intensity on the projection screen usual with the direct current arcs.

Although the above is believed to be a correct explanation of the reasons why my invention will operate satisfactorily, I do not, of course, wish to be bound thereby in the event other reasons should become apparent. I have actually built and thoroughly tested apparatus operating in accordance with the fore-description and found that it operates satisfactorily regardless of how such operation may be explained.

Although I have described my invention in connection with a standard shutter having 90 degree openings and operated at standard speed, it will be understood that the principles of my invention are applicable to different types of shutters and operating at different speeds. If, for example, the shutter blades should be narrower or wider than the shutter openings, or if the shutter should be operated at other than standard speed, the proper combination of shutter openings, shutter speed and arc frequency may be determined in accordance with the foregoing disclosure for operation in accordance with the principles of my invention.

It will be understood I do not limit myself to a motion picture projector incorporating an alternating current electric carbon arc as my invention is applicable to any type of light source, operating on alternating currents, which flashes intermittently, such as neon tubes, mercury vapor tubes, etc.

I claim:

1. In combination with a motion picture projector having film moving means adapted to intermittently move a film, a source of light, optical means for casting a beam of light from said source through the film, shutter means providing light passing openings adapted to project and intercept said light beam for substantially like duration periods moving in the path of said light beam and driven in synchronism with the film moving means so that the film is moved during predetermined periods of light interception and said light beam is projected through said shutter openings during stationary periods of the film, means for driving the projector at a speed such as to move the film at the required number of frames per second, and a source of alternating current supplying to said light source an alternating current of a frequency to provide said light source with substantially one cycle of said current during each shutter open period and a like cycle of current during each period of light interception.

2. In combination with a motion picture projector having film moving means adapted to intermittently move a film, a source of light, optical means for casting a beam of light from said source through the film, shutter means providing light passing openings adapted to project and intercept said light beam for substantially like duration periods moving in the path of said light beam and driven in synchronism with the film moving means so that the film is moved during predetermined periods of light interception and said light beam is projected through said shutter openings during stationary periods of the film, means for driving the projector at a speed such as to move the film at the required number of frames per second, and a source of alternating current supplying to said light source an alternating current of a frequency to provide said light source with substantially integral cycles of said current during each shutter open period and like cycles during each period of light interception.

3. In combination with a motion picture projector having film moving means adapted to intermittently move a film, a source of light, optical means for casting a beam of light from said source through the film, shutter means providing light passing openings adapted to project and intercept said light beam for substantially like duration periods moving in the path of said light beam and driven in synchronism with the film moving means so that the film is moved during predetermined periods of light interception and said light beam is projected through said shutter openings during stationary periods of the film, means for driving the projector at a speed such as to move the film at the required number of frames per second, and a frequency converter adapted to be supplied with electrical current from commercial frequency current supply lines and to deliver to said light source an alternating current of a frequency to provide said light source with substantially integral cycles of said current during each shutter open period and like integral cycles of current during each period of light interception.

4. In combination with a motion picture projector having film moving means adapted to intermittently move a film, electric arc carbons forming a source of light, optical means for casting a beam of light from said source through the film, a shutter having a plurality of blades providing separated equal light passing openings and interceptions moving in the path of the light beam and driven in synchronism with the film moving means to provide two shutter openings during each stationary period of the film, means for driving the projector at a speed to move the film at the required number of frames per second, and a frequency converter adapted to be supplied with electrical current from commercial frequency current supply lines and to deliver an alternating current output to said carbons of a frequency such that there is substantially one cycle of said current during each shutter open period and a like cycle of current during each period of light interception.

5. A method of motion picture projection which comprises providing an alternating current of predetermined frequency, producing a pulsating light from said current, selectively intercepting said light from substantially one cycle of said current to provide substantially equal periods of interception and projection of said light, moving a film during predetermined periods of light interception, and projecting the non-intercepted light from a like cycle of current through a stationary film frame to provide substantially uniform illumination during periods of light projection and to intercept an equal amount of light during periods of light interception.

6. A method of motion picture projection which comprises providing an alternating current of predetermined frequency, producing a pulsating light from said current, selectively intercepting said light from substantially integral cycles of said current to provide substantially equal periods of interception and projection of said light, moving a film during predetermined periods of light interception, and projecting the non-intercepted light from like integral cycles of current through a stationary film frame to provide substantially uniform illumination during periods of light projection and to intercept an equal amount of light during periods of light interception.

CLARENCE S. ASHCRAFT.